US009491786B1

(12) United States Patent
Petkus et al.

(10) Patent No.: US 9,491,786 B1
(45) Date of Patent: Nov. 8, 2016

(54) SYSTEMS AND METHODS FOR SPACE-BASED DIGITAL SELECTIVE CALLING

(71) Applicant: HARRIS CORPORATION, Melbourne, FL (US)

(72) Inventors: Eric Petkus, Palm Bay, FL (US); Timothy F. Dyson, Melbourne, FL (US); Jason Plew, Malabar, FL (US); Joshua P. Bruckmeyer, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 14/863,797

(22) Filed: Sep. 24, 2015

(51) Int. Cl.
H04W 4/22 (2009.01)
H04W 4/02 (2009.01)
G01S 3/14 (2006.01)
H04W 76/00 (2009.01)
H04B 7/185 (2006.01)

(52) U.S. Cl.
CPC ....... H04W 76/007 (2013.01); H04B 7/18517 (2013.01); H04W 4/02 (2013.01); H04W 4/22 (2013.01); G01S 3/14 (2013.01)

(58) Field of Classification Search
CPC ....... B63B 43/00; G01S 5/0081; G01S 5/22; G01S 3/14; G01S 3/46; G08B 21/10; G08B 25/009; G08B 27/008; H04H 20/59; H04H 60/27; H04H 60/40; H04M 1/65
See application file for complete search history.

(56) References Cited

U.S. PATENT DOCUMENTS 4,776,035 A * 10/1988 Duggan ............. H04B 7/18513
455/10
5,926,467 A * 7/1999 Hershey ............. H04B 7/18532
370/316
7,545,854 B1 6/2009 Gronemeyer
7,809,370 B2 * 10/2010 Stolte ................. H04B 7/18513
455/427
8,013,733 B1 * 9/2011 Vallaire ................ G08B 25/009
340/539.1
8,275,077 B1 9/2012 Nelson
8,374,292 B2 2/2013 Peach
8,665,997 B1 3/2014 Smith (Continued)

FOREIGN PATENT DOCUMENTS

DE     EP 1351413 A1 * 10/2003  ......... H04B 7/18504
DE     EP 1351413        4/2006
DE     102012110384 A1   4/2014

OTHER PUBLICATIONS

Guo, S., "Space-Based Detection of Spoofing AIS Signals Using Doppler Frequency," Multisensor, Multisource Information Fusion: Architectures, Algorithms, and Applications 2014, Proc. of SPIE vol. 9121, 912108 © 2014 SPIE CCC Code: 0277-786X/14; doi: 10.1117/12.2050448.

(Continued)

Primary Examiner — Nizar Sivji
(74) Attorney, Agent, or Firm — Fox Rothschild LLP; Robert J. Sacco; Carol E. Thorstad-Forsyth

(57) ABSTRACT

Systems (100) and methods (300) for providing Digital Selective Calling ("DSC") based services. The methods involve: receiving, by a satellite (104) deployed in space, a DSC emergency message transmitted from a vessel (102) located in a body of water on Earth; and performing operations by the satellite to deliver the DSC emergency message to an appropriate authority located on Earth.

12 Claims, 3 Drawing Sheets

(56) References Cited

U.S. PATENT DOCUMENTS

| | | | |
|---|---|---|---|
| 8,693,587 | B2 | 4/2014 | Giraud et al. |
| 8,750,429 | B2* | 6/2014 | Jones .................... H04B 1/001 375/219 |
| 8,970,426 | B1 | 3/2015 | Stockmann et al. |
| 2006/0269017 | A1 | 11/2006 | Beadle et al. |
| 2009/0167536 | A1* | 7/2009 | Clark ....................... B63C 9/00 340/573.4 |
| 2011/0075602 | A1 | 3/2011 | Peach et al. |
| 2011/0207398 | A1* | 8/2011 | Calmettes .......... H04B 7/18513 455/12.1 |
| 2012/0007750 | A1* | 1/2012 | Gorabi ................... B63B 43/00 340/984 |
| 2013/0093625 | A1* | 4/2013 | Smith .................. G01S 5/0081 342/387 |
| 2014/0218217 | A1* | 8/2014 | Calvar Anton ........... B63C 9/08 340/984 |
| 2016/0054425 | A1* | 2/2016 | Katz ........................ G01S 3/14 342/417 |

OTHER PUBLICATIONS

Faragher, R., et al., "Spoofing Mitigation, Robust Collision Avoidance, and Opportunistic Receiver Localisation Using a New Signal Processing Scheme for ADS-B or AIS," Proceedings of the 27th International Technical Meeting of The Satellite Division of the Institute of Navigation (ION GNSS+ 2014), Sep. 8-12, 2014, Tampa Convention Center, Tampa, Florida.

Papi, F., et al., "Radiolocation and Tracking of Automatic Identification System Signals for Maritime Situational Awareness," Published in IET Radar, Sonar & Navigation, 2015, vol. 9, iss. 5, pp. 568-580, doi: 10.1049/iet-rsn. 2014.0292, © The Institution of Engineering and Technology 2015.

Petkus, Eric, "Optimizing a Global Satellite Constellation for AIS and Maritime Domain Awareness," http://cdn2.hubspot.net/hubfs/183611/CollateralforDownload/exactView RT Whitepaper.pdf, published Jun. 2, 2015, D0777.

Larsen, J.A., et al., "An SDR Based AIS Receiver for Satellites," Recent Advances in Space Technologies (RAST), 2011 5th International Conference, pp. 526, 531, Jun. 9-11, 2011; ISBN: 978-1-4244-9617-4; DOI: 10.1109/RAST.2011.5966893.

Picard, M., et al., "An adaptive mutli-user multi-antenna receiver for satellite-based AIS detection," Advanced Satellite Multimedia Systems Conference (ASMS)_and 12th Signal Processing for Space Communications Workshop (SPSC), 2012, pp. 273, 289, Sep. 5-7, 2012, ISBN: 978-1-4673-2676-6, DOI: 10.1109/ASMS-SPSC.2012.63333088.

Prevost, R., et al., "Partial CRC-assisted error correction of AIS signals received by satellite," Acoustics, Speech and Signal Processing (ICASSP), 2014 IEEE International Conference, pp. 1951, 1955, May 4-9, 2014; DOI: 10.1109/CASSP.2014.6853939.

Gallardo, M.J., et al., "Coherent receiver for AIS Satellite Detection," Communications, Control and Signal Processing (ISCCP), 2010 4th International Symposium, pp. 1-4, Mar. 3-5, 2010, ISBN: 978-1-4244-6285-8; DOI: 10.1109/ISCCP.2010.5463417.

* cited by examiner

SYSTEMS AND METHODS FOR SPACE-BASED DIGITAL SELECTIVE CALLING

BACKGROUND OF THE INVENTION

1. Statement of the Technical Field

This document relates to systems employing Digital Selective Calling ("DSC"). More particularly, this document concerns systems and methods for space-based DSC.

2. Description of the Related Art

Automatic Identification Systems ("AISs") are well known in the art. The AISs typically allow vessels (e.g., ships) to view and track marine traffic in a surrounding area. AISs have many applications. For example, AISs can be employed for collision avoidance, fishing fleet monitoring and control, vessel traffic services, maritime security, navigation services, search and rescue, accident investigation, and fleet and cargo tracking.

In this regard, an AIS is an automatic tracking system used on ships and by Vessel Traffic Services ("VTSs") for identifying and locating vessels in a given geographic area or around the globe. A vessel's identification and location are tracked by exchanging data with other nearby vessels, AIS base stations and satellites. The vessel's identification and location are displayed in an AIS chartplotter or other Graphical User Interface ("GUI") viewable on a display screen. The AIS chartplotter and other GUIs facilitate collision avoidance amongst a plurality of vessels in proximity to each other. Other information may also be displayed on the display screen, such as a vessel's position, course and/or speed.

The vessels comprise AIS transceivers which automatically and periodically transmit vessel information. The vessel information includes, but is not limited to, vessel name, position, speed and navigational status. The vessel information can be used to track the vessel by the AIS base stations and/or satellites. The AIS transceivers comprise a Very High Frequency ("VHF") transceiver and a positioning system (e.g., a Global Positioning System ("GPS")). The VHF transceiver has a VHF RF range of about 10-20 miles in conjunction with a Self-Organized Time Division Multiple Access ("SOTDMA") scheme.

The vessels and coastal stations also have a DSC capability. In this regard, each of the vessels and coastal stations consists of a VHF DSC transceiver. The VHF DSC transceiver facilitates distress related communications over terrestrial marine radio systems. For example, in the event of an emergency, the VHF transmitter is used to send an automatically formatted distress alert signal to surrounding vessels and/or coastal stations of rescue authorities. The distress alert signal can include a designation specifying the nature and priority level of the call, a vessel's unique identifier (e.g., Maritime Mobile Service Identity ("MMSI")), and the vessel's position. In response to a reception of a distress alert signal, vessels and/or coastal station(s) send a DSC acknowledgement message to the vessel that transmitted the distress alert signal. The DSC acknowledgement message is received by the VHF DSC receiver. Thereafter, the AIS transceiver tunes to a designated channel for further distress related communications.

Despite the advantages of the DSC capability, it suffers from certain drawbacks. For example, there is minimal to no DSC coverage in the polar regions of the globe. As such, oil exploration ships exploring the polar regions of the globe cannot rely on a DSC capability for distress related communications. Additionally, there is no DSC capability when vessels operate beyond the RF range of DSC-equipped coastal regions and nearby vessels (e.g., open oceans).

SUMMARY OF THE INVENTION

This disclosure concerns systems and methods for providing global DSC based services. The DSC based service is a global service implemented at least partially by a constellation of satellites with persistent coverage deployed in space. The global service provides persistent, Earth coverage including the north and south poles.

The methods involve: receiving, by a satellite deployed in space, of a DSC emergency message transmitted from, on or near (e.g., atmosphere) the Earth; performing operations by the satellite system to deliver the DSC emergency message to an appropriate authority located on Earth; performing operations by the satellite and/or ground processing system to determine geolocation data and time location data to the DSC emergency message; delivering the DSC emergency message to the appropriate authority along with the geolocation data and time location data; and/or cross-correlating the geolocation data and time location data with other (e.g., AIS) data obtained from or associated with the DSC transmission. Notably, the satellite systems can geo-locate and timestamp DSC messages from vessels/transmitters that do not have any GPS equipment or have in-operative or mis-configured GPS equipment.

In some scenarios, the methods also involve performing operations by the satellite to: intercept a DSC VHF call setup message sent from the vessel; make a determination of the channel that is to be used in a DSC VHF call between VHF call participants; and/or deliver the DSC VHF call setup message.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

It should also be appreciated that the terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Further, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present document generally concerns systems and methods for space-based DSC services. The systems and methods provide a persistent, global solution for DSC messaging. This solution greatly enhances, extends and fulfills the Safety of Life At Sea ("SOLAS") mission mandate when the vessels (1) are beyond reach of shore stations, (2) are beyond the reach of Geostationary satellite communications, or (3) are within range of the shore stations but do not have a GPS system or an inoperative or mis-configured GPS system.

Figure 1:
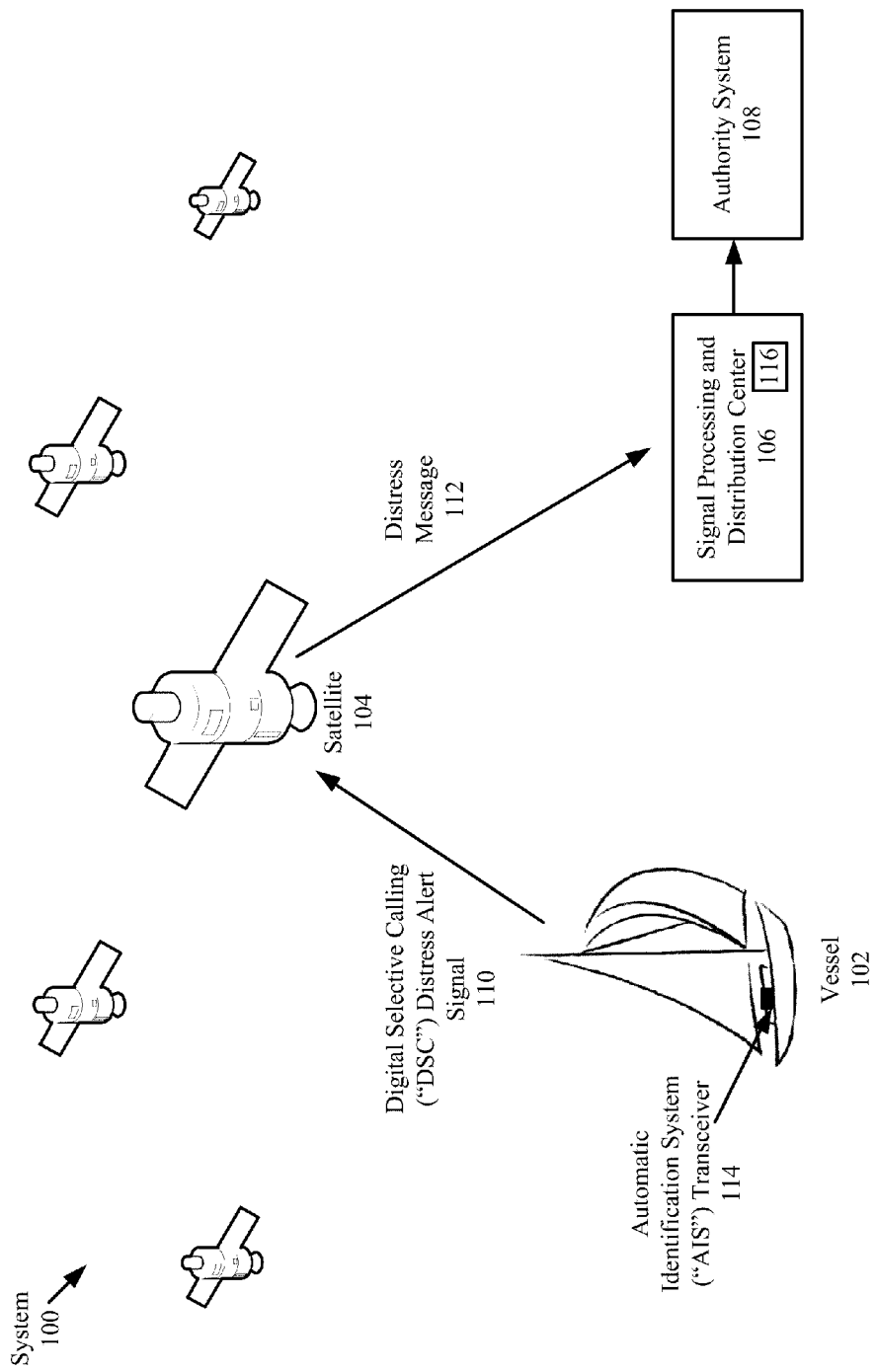
FIG. 1 is an illustration of an exemplary satellite system.

Referring now to FIG. 1, there is provided an illustration of an exemplary system 100. System 100 comprises a DSC transmitter (e.g., a vessel) 102, a plurality of satellites 104, a Signal Processing and Distribution ("SPD") center 106, and an authority system 108. The satellites 104 collectively have a constellation architecture of N (e.g., 66) cross-linked Low-Earth Orbit ("LEO") active satellites arranged in orbit so as to cover 100% of the globe. Additional spare satellites (not shown) are provided to serve in case of failure. The satellites 104 are deployed at locations in space so as to have overlapping coverage areas. The satellites 104 communicate with neighboring satellites via $K_a$ band inter-satellite links. Each satellite 104 can have four inter-satellite links: two to neighbors fore and aft in the same orbital plane; and two to satellites in neighboring planes to either side.

Each of the satellites 104 comprises a Space-Born Maritime ("SBM") receiver. An exemplary architecture for an SBM receiver will be discussed in detail below in relation to FIG. 2. Still, it should be understood that the SBM receiver is configured to receive any signal in the marine VHF band (i.e., 156.025-162.025 MHz). As such, the satellites 104 provide a means for truly global communications at sea (even including the north/south pole areas of the globe), and also provide global persistence over the entire VHF maritime frequency band. Maritime communications are generally used for ship tracking in an AIS system. Since the satellites 104 comprise SBM receivers, the satellites can receive other VHF frequency bands in addition to those used in an AIS system.

The space-based receive capability facilitates the implementation of other maritime communication services within the system 100, such as a DSC service for distress related communications to and from terrestrial radio systems. The DSC service is a 24 hour, seven days of the week monitoring service. The DSC capability of the system 100 spans both the space segment (which includes the actual SBM receivers) where the DSC messages are received and also the ground segment (which includes the SPDC 106) where the DSC messages are processed. Additionally, the DSC capability of system 100 is a truly global, real-time DSC capability. Such a truly global, real-time DSC capability is not provided by conventional DSC systems. The term "real-time, as used herein, means either simultaneously, immediately, or promptly.

During operation, the transmitter (e.g., vessel) 102 transmits a DSC distress alert signal 110 using a VHF transceiver 114 disposed thereon. VHF transceivers are well known in the art, and therefore will not be described in detail herein. The DSC distress alert signal 110 consists of a pre-formatted distress message for initiating emergency communications with other ships and rescue coordination centers. The DSC distress alert signal 110 is received by the SBM receiver of satellite 104. At the satellite 104, the DSC distress alert signal 110 is processed to obtain the DSC message 112 contained therein. This signal processing generally involves a direct sampling of the VHF spectra to detect the DSC message. Thereafter, a DSC message 112 is relayed from the satellite 104 to the SPDC 106. Upon receipt of the DSC message 112, the SPDC 106 processes the DSC message and forwards alerts to the authority system 108 (e.g., the coast guard and/or navy) so that appropriate measures can be taken by the authorities.

Notably, conventional global satellite networks do not provide this space-based DSC capability at the north and south poles of the Earth. In contrast, the space-based DSC capability of system 100 is provided at the north and south poles of the Earth. Similarly, Emergency Position-Indicating Radio Beacon ("EPIRB") systems do not provide coverage at the north and south poles of the globe. As such, system 100 is a superior maritime communications system as compared to conventional global satellite networks and EPIRB systems.

As evident from the above-discussion, there are many novel features of system 100. These novel features include, but are not limited to, the following: using an SBM receiver to collect and process DSC emergency messages or DSC distress alert messages from space; using a constellation of satellites to provide real-time delivery of the DSC emergency or distress alert messages to the appropriate authorities so as to provide global coverage for DSC distress services; assigning by the satellites geolocation data and time location data to DSC emergency or distress alert messages to provide precise positioning of a DSC transmitter in real-time; providing an ability to geo-locate and timestamp DSC messages from transmitters that do not have any GPS equipment or in-operative or mis-configured GPS equipment; and cross-correlating the geolocation location data and time location data with AIS data obtained for the same transmitter so as to provide more precise positioning a transmitter (e.g., a vessel).

In some scenarios, the geolocation is achieved using Angle Of Arrival ("AOA"), Time Of Arrival ("TOA") information, Frequency Of Arrival ("FOA") information, Time Difference of Arrival ("TDOA") information and/or Frequency Difference Of Arrival ("FDOA") information generated by one or more satellites in the constellation. As noted above, the satellites 104 are deployed at locations in space so as to have overlapping coverage areas. In effect, two or more satellites can receive the same DSC signal sent from a vessel simultaneously, concurrently, or within a relatively short amount of time of each other. Accordingly, the TDOA and/or FDOA can be used to determine a geographic location of the transmitter (e.g., a vessel). Algorithms for computing the TDOAs and FDOAs are well known in the art. Any known or to be known algorithm for computing TDOAs and/or FDOAs can be used herein without limitation.

The term "Time Of Arrival ("TOA")", as used herein, refers to the travel time a DSC signal from an AIS transmitter of a vessel to a remote SBM receiver of a satellite. The term "Frequency Of Arrival ("FOA"), as used herein, refers to the frequency at which a DSC signal is received by a remote SBM receiver. The term "Time Difference Of Arrival ("TDOA"), as used herein, refers to a measured time difference between the TOA determined at a first remote SBM receiver and the TOA determined at a second remote SBM receiver. The TDOA can be determined by computing the time of arrival difference between signals arriving at two SBM receivers separated in space. The term "Frequency Difference Of Arrival ("FDOA"), as used herein, refers to a measured frequency difference between the FOA determined at a first remote SBM receiver and the FOA determined at a second remote SBM receiver.

Figure 2:
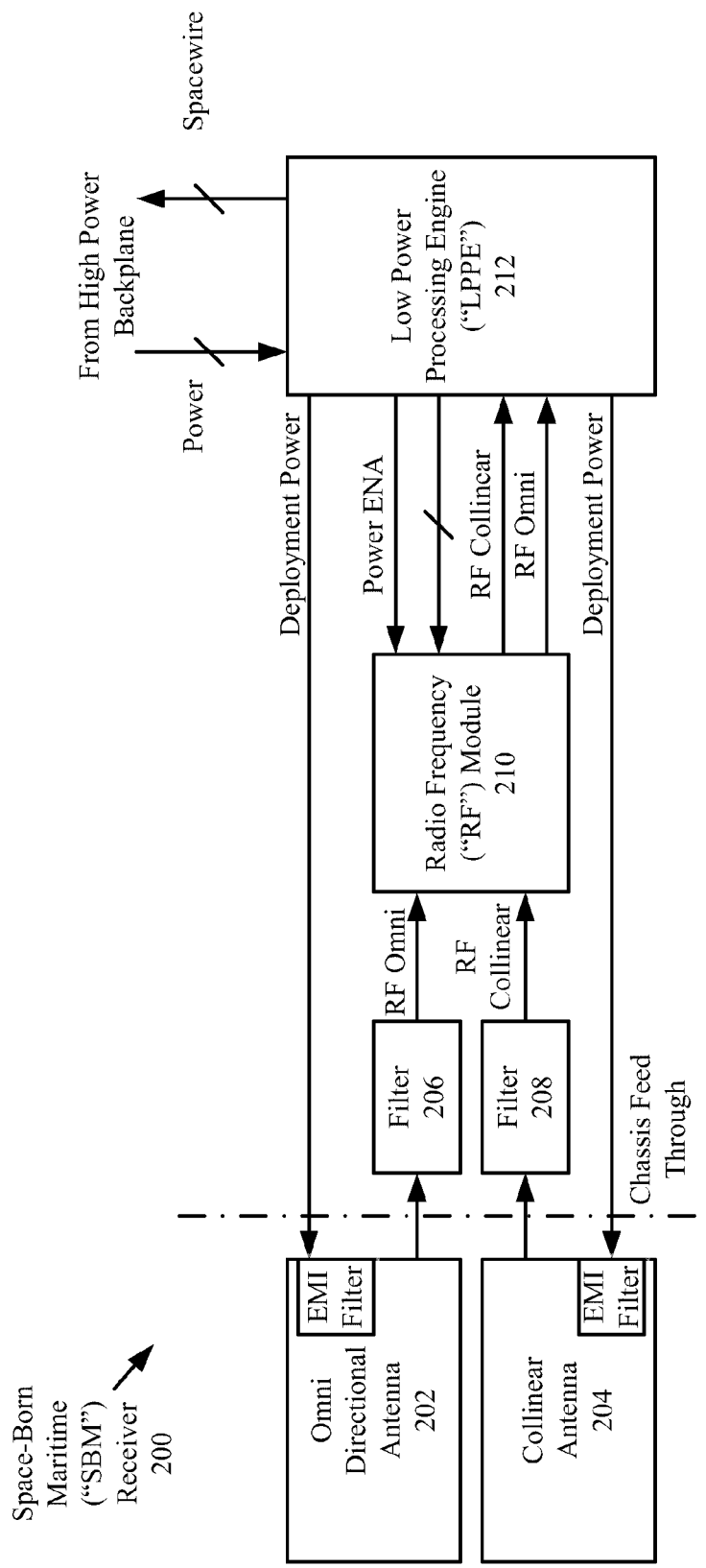
FIG. 2 is an illustration of an exemplary architecture for a space-borne maritime VHF receiver.

Referring now to FIG. 2, there is provided an illustration of an exemplary receiver 200 that is deployed in a satellite (e.g., satellite 104 of FIG. 1). Receiver 200 is generally configured to receive, process and report various maritime VHF mobile band channel traffic. The primary channels of interest are the AIS channels (terrestrial and long-range), the Application Specific Message ("ASM") channels, and the DSC channel(s) (e.g., channel 70).

As shown in FIG. 2, the receiver 200 comprises two antennas, namely an omni-directional antenna 202 and a collinear antenna 204. The receiver 200 also comprises filters 206, 208, a Radio Frequency ("RF") module 210 and a Low Power Processing Engine ("LPPE") 212. Components 206-210 collectively perform impedance matching, amplification and filtering to isolate the maritime mobile radio band and ensure adjacent channel VHF energy rejection to at least 60 dBc relative to individual maritime mobile 25 Hz channel communications. This processing is expanded to include the DSC frequency band.

The isolated spectrum is passed to the LPPE 212 for direct Analog-to-Digital ("A/D") data conversion to generate digitized samples. The digitized samples are then processed to detect, characterize and demodulate a plurality of communication channels (e.g., 6 communication channels) so as to simultaneously obtain AIS messages and/or DSC messages contained therein. The signal processing generally involves co-channel spatial filtering and actual demodulation of the AIS messages and/or DSC messages in orbit (e.g., by a satellite). The AIS messages and/or DSC messages are then sent from the SBM receiver 200 to a ground based system (e.g., SPDC 106 of FIG. 1).

In some scenarios, the signal processing is entirely performed in firmware of the LPPE 212. In this regard, the LPPE 212 is implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

Figure 3:
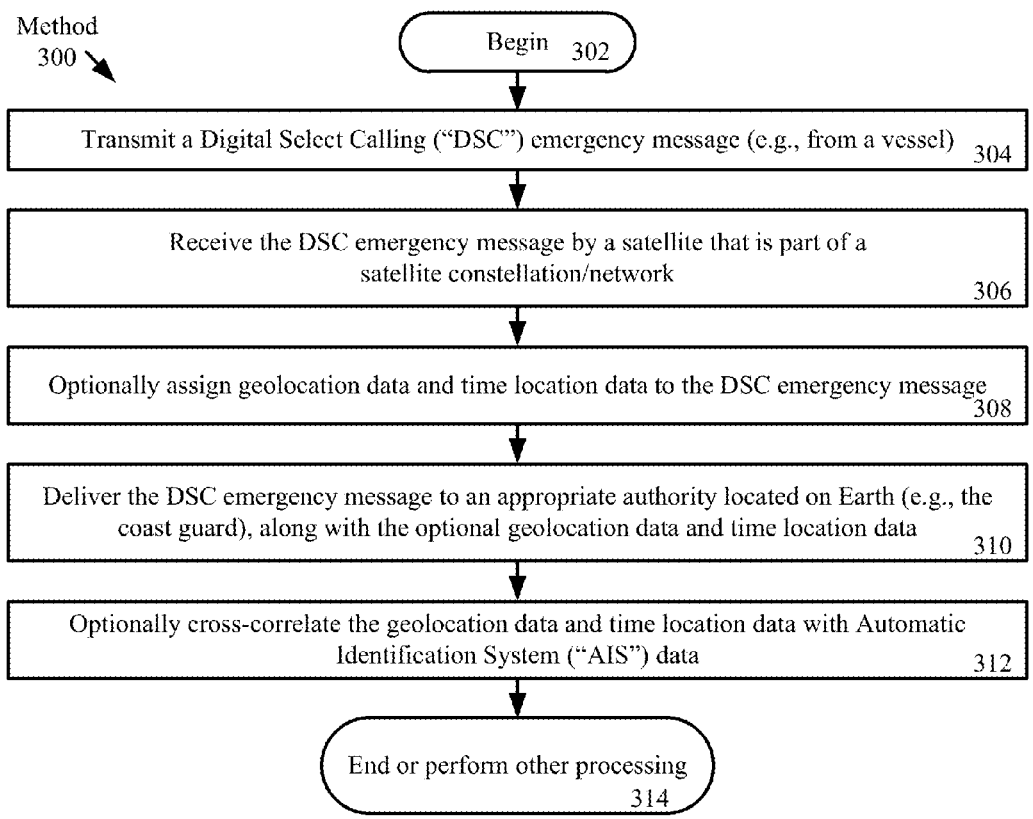
FIG. 3 is a flow diagram of an exemplary method for providing space-based DSC services.

Referring now to FIG. 3, there is provided a flow diagram of an exemplary method 300 for providing a space-based DSC based service. The DSC based service is a global service implemented at least partially by a constellation of satellites deployed in space. The global service is available at all locations of the Earth, including the Earth's north and south poles.

As shown in FIG. 3, method 300 begins with step 302 and continues with step 304 where a DSC emergency message is transmitted (e.g., from vessel 102 of FIG. 1). The DSC emergency message is received in step 306 by a satellite (e.g., satellite 104 of FIG. 1) deployed in space. The satellite forms part of a satellite constellation/network. At the satellite, operations are performed in steps 308-310 to: optionally assign geolocation data and time location data to the DSC emergency message; and/or deliver the DSC emergency message to an appropriate authority located on Earth. The DSC emergency message may be delivered along with the optional geolocation data and time location data. Thereafter, in step 312, the geolocation data and time location data is optionally cross-correlated with AIS data obtained for the vessels. Upon completing step 312, step 314 is performed where method 300 ends or other processing is performed.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for providing Digital Selective Calling ("DSC") based services, comprising:

using Space-Born Maritime ("SBM") receivers of satellites deployed in space as a satellite constellation to collect and process DSC emergency messages transmitted from DSC transmitters of terrestrial radios in an event of an emergency;

using the satellites to deliver the DSC emergency messages to appropriate authorities located on Earth so as to provide global coverage for DSC distress services that users sense as being immediately available;

determining first positions of the DSC transmitters in transit based on geolocation data and time location data respectively assigned by the satellites to the DSC emergency messages; and transforming the first positions to more precise second positions based on results of cross-correlations of the geolocation data and time location data with Automatic Identification Systems ("AIS") data obtained for the DSC transmitters.

2. The method according to claim 1, wherein the DSC based service is a global service implemented at least partially by the satellite constellation.

3. The method according to claim 2, wherein the global service is available throughout the Earth including the Earth's north and south poles.

4. The method according to claim 1, further comprising:

performing operations by the satellites to assign the geolocation data and time location data to the DSC emergency messages; and delivering the DSC emergency messages to the appropriate authorities along with the geolocation data and time location data.

5. The method according to claim 1, further comprising performing operations by the satellites to geo-locate and timestamp DSC messages from radios that do not have any GPS equipment or have in-operative or mis-configured GPS equipment.

6. The method according to claim 1, further comprising performing operations by the satellites to intercept a DSC Very High Frequency ("VHF") call setup message sent from terrestrial radios.

7. A system, comprising:
a plurality of satellites deployed in space as a satellite constellation and comprising Space Born Maritime ("SBM") transceivers operative to provide a space-based Digital Selective Calling ("DSC") based service at least by
receiving DSC emergency messages transmitted from DSC transmitters of terrestrial radios in an event of an emergency,
delivering the DSC emergency messages to appropriate authorities located on Earth so as to provide global coverage for DSC distress services that users sense as being immediately available,
assigning geolocation data and time location data respectively to the DSC emergency messages;
wherein first positions of the DSC transmitters in transit are determined based on the geolocation data and time location data; and
wherein the first positions are transformed into more precise second positions based on results of cross-correlations of the geolocation data and the time location data with Automatic Identification Systems ("AIS") data obtained for the DSC transmitters.

8. The system according to claim 7, wherein the space-based DSC based service is a global service implemented at least partially by the satellite constellation.

9. The system according to claim 8, wherein the global service is available in Earth's north and south poles.

10. The system according to claim 8, wherein the satellites further perform operations to
assign geolocation data and time location data to the DSC emergency messages, and
deliver the DSC emergency messages to the appropriate authorities along with the geolocation data and time location data.

11. The system according to claim 7, wherein the satellites further perform operations to geo-locate and timestamp DSC messages from radios that do not have any GPS equipment or have in-operative or mis-configured GPS equipment.

12. The system according to claim 7, wherein the satellites further perform operations to intercept DSC Very High Frequency ("VHF") call setup messages sent from terrestrial radios.

* * * * *